(12) United States Patent
Futase

(10) Patent No.: US 11,279,509 B2
(45) Date of Patent: Mar. 22, 2022

(54) FILL-PACKAGING METHOD FOR PLURAL ROWS AND FILL-PACKAGING MACHINE FOR PLURAL ROWS

(71) Applicant: YUSHIN CO., LTD., Niigata (JP)

(72) Inventor: Katsunori Futase, Niigata (JP)

(73) Assignee: YUSHIN CO., LTD., Niigata (JP)

( * ) Notice: Subject to any disclaimer, the term of this patent is extended or adjusted under 35 U.S.C. 154(b) by 0 days.

(21) Appl. No.: 16/614,980

(22) PCT Filed: Apr. 5, 2019

(86) PCT No.: PCT/JP2019/015159
§ 371 (c)(1),
(2) Date: Nov. 19, 2019

(87) PCT Pub. No.: WO2019/182165
PCT Pub. Date: Sep. 26, 2019

(65) Prior Publication Data
US 2021/0039818 A1 Feb. 11, 2021

(30) Foreign Application Priority Data

Apr. 13, 2018 (JP) .............................. JP2018-077439
May 29, 2018 (JP) .............................. JP2018-102777
Jun. 15, 2018 (JP) .............................. JP2018-114791

(51) Int. Cl.
*B65B 51/26* (2006.01)
*B65B 9/067* (2012.01)
(Continued)

(52) U.S. Cl.
CPC .............. *B65B 51/26* (2013.01); *B65B 9/023* (2013.01); *B65B 9/067* (2013.01); *B65B 51/306* (2013.01);
(Continued)

(58) Field of Classification Search
CPC ......... B65B 9/023; B65B 9/067; B65B 51/16; B65B 51/26; B65B 51/306; B65B 61/08; B65B 61/18; B65B 2220/06; B65D 75/58
(Continued)

(56) References Cited

U.S. PATENT DOCUMENTS 2,616,232 A 11/1952 Meyer
3,109,764 A * 11/1963 Natelli .................... B65B 51/16
53/374.4

(Continued)

FOREIGN PATENT DOCUMENTS

DE 34 47 243 6/1986
EP 0 129 512 12/1984
(Continued)

OTHER PUBLICATIONS

Notification Concerning Transmittal of International Preliminary Report on Patentability, WIPO, Application No. PCT/JP2019/015159, dated Oct. 22, 2020.
(Continued)

*Primary Examiner* — Stephen F. Gerrity
(74) *Attorney, Agent, or Firm* — Greenblum & Bernstein, P.L.C.

(57) ABSTRACT

A fill-packaging method for plural rows, a fill-packaging machine for plural rows and a fill-packaged body include a wide-width cylindrical body forming process for continuously longitudinal-sealing a plastic film longitudinally unreeled in the longitudinal direction to continuously form a single wide-width cylindrical body, a sealing and cutting process for continuously heat-sealing one or more widthwise positions of the wide-width cylindrical body to form longitudinally border sealed portions and continuously cutting the longitudinally border sealed portions in the longitudinal direction to cut out the wide-width cylindrical body into a
(Continued)

plurality of narrow-width cylindrical body rows independently arranged in parallel, and a bag-making process for continuously manufacturing packaged bodies by applying horizontal sealing to each of the narrow-width cylindrical body rows separated and run independently in the longitudinal direction at predetermined intervals while filling a packing material therein.

15 Claims, 5 Drawing Sheets

(51) Int. Cl.
    *B65B 9/02*           (2006.01)
    *B65B 51/30*         (2006.01)
    *B65B 61/08*         (2006.01)
    *B65D 75/58*         (2006.01)
    *B65H 35/02*         (2006.01)

(52) U.S. Cl.
    CPC .............. *B65B 61/08* (2013.01); *B65D 75/58* (2013.01); *B65B 2220/06* (2013.01); *B65H 35/02* (2013.01)

(58) Field of Classification Search
    USPC ... 53/412, 451, 133.3, 133.8, 202, 546, 551, 53/554
    See application file for complete search history.

(56) References Cited

U.S. PATENT DOCUMENTS

| | | | | |
|---|---|---|---|---|
| 3,383,269 A | * | 5/1968 | Kopp | ...................... B65B 9/023 53/554 |
| 3,760,559 A | * | 9/1973 | Heinzer | .................... B65B 9/06 53/546 |
| 4,715,166 A | | 12/1987 | Kameda | |
| 4,768,330 A | * | 9/1988 | Lane, Jr. et al. | ...... B65B 51/303 53/554 |
| 5,235,794 A | * | 8/1993 | Center | .................... B65B 9/213 53/202 |
| 6,092,354 A | * | 7/2000 | Takahashi | ............. B65B 61/08 53/546 |
| 7,124,556 B2 | * | 10/2006 | Noumi | .................... B65B 9/213 53/502 |
| 2017/0297752 A1 | * | 10/2017 | Kogure et al. | .......... B65B 61/18 |

FOREIGN PATENT DOCUMENTS

| | | | | |
|---|---|---|---|---|
| FR | 1.068.961 | | 7/1954 | |
| FR | 1.130.714 | | 2/1957 | |
| JP | 53-71997 | | 6/1978 | |
| JP | 03043360 A | * | 2/1991 | |
| JP | 5-52081 | | 9/1993 | |
| JP | 6-99913 | | 4/1994 | |
| JP | 2001-114220 | | 4/2001 | |
| JP | 2001097393 A | * | 4/2001 | |
| JP | 2005-145473 | * | 11/2003 | ............... B65B 9/08 |
| JP | 2005-145473 | | 6/2005 | |
| JP | 2006-206153 | | 8/2006 | |
| JP | 2006206153 A | * | 8/2006 | ........... B65B 51/306 |
| JP | 2009083936 A | * | 4/2009 | |
| JP | 5245097 | | 7/2013 | |
| JP | 2015-217944 | | 12/2015 | |
| WO | 2013/069678 | | 5/2013 | |

OTHER PUBLICATIONS

International Preliminary Report on Patentability, WIPO, Application No. PCT/JP2019/015159, dated Oct. 13, 2020, English translation.
Notification of Transmittal of Translation of the International Preliminary Report on Patentability, WIPO, Application No. PCT/JP2019/015159, dated Oct. 22, 2020.
International Search Report issued in International Patent Application No. PCT/JP2019/015159, dated May 7, 2019 (with English translation).
Extended European Search Report, European Patent Office, in counterpart European Patent Application No. 19771002.3, dated Dec. 6, 2021 (in English).

* cited by examiner

FILL-PACKAGING METHOD FOR PLURAL ROWS AND FILL-PACKAGING MACHINE FOR PLURAL ROWS

TECHNICAL FIELD

This invention relates to a method for manufacturing a packaged body by making a bag from an elongated plastic film and filling and packaging a packing material such as liquid, viscous material, powder and granular material or the like therein, and a fill-packaging machine therefor and a fill-packaged body. Especially, the invention relates to a fill-packaging method for plural rows capable of simultaneously and continuously manufacturing a plurality of packaged bodies in parallel by a single fill-packaging machine, and a fill-packaging machine for plural rows and a fill-packaged body.

RELATED ART

A cited document 1 discloses an example of a fill-packaging machine for plural rows capable of filling and packaging a packing material such as liquid, viscous material or powder and granular material of food and drink, seasoning, medicines, chemicals and so on in each of bags formed by simultaneously making a soft plastic film to a plurality of bag rows in parallel.

This fill-packaging machine for plural rows is constructed so as to manufacture four-sealed type package bags in plural rows by cutting out a single wide plastic film into four or more rows, and making a bag from each cut narrow plastic film at a state of maintaining the plural rows independently and filling the packing material therein.

PRIOR ART DOCUMENT

Patent Document

Patent Document 1: JP-A-2015-217944

SUMMARY OF THE INVENTION

Task to be Solved by the Invention

In the fill-packaging machine for plural rows disclosed in Patent Document 1, each of the independent narrow plastic films of plural rows is folded into two parts in a widthwise central position and longitudinal sealing is conducted at overlapped edge portions thereof. However, there is a problem in such a fill-packaging machine that poor sealing is liable to be generated because it is very difficult to guide and fold the narrow plastic film so as to accurately overlap the edge portions thereof.

To this end, the single wide plastic film is folded into two parts and longitudinal sealing is performed in plural rows to form a plurality of cylindrical portion rows connected to each other in a horizontal direction. And after filling of the packing material and horizontal sealing are conducted, the cylindrical portion rows are cut for every packaged body. In this case, horizontal sealing is performed by a pair of horizontal sealing rolls while simultaneously grasping the plurality of cylindrical portion rows connected to each other in the horizontal direction therebetween, so that the plurality of cylindrical portion rows are at a state of expanding with the packing material and hence the whole of the packaging plastic film cannot be expanded in the widthwise direction and there is a fatal defect that a relatively large filling amount cannot be ensured. In addition, there are problems that the packing material is trapped in the horizontal sealed portion and longitudinal wrinkles are easily formed and sealing strength is lacked to cause leakage of the packing material and breakage of the bag.

In the conventional fill-packaging machine for plural rows, the plural packaged bodies can be manufactured simultaneously, so that there is a feature that the packaged bodies can be manufactured in a high production efficiency. However, the many packaged bodies manufactured by the fill-packaging machine for plural rows are four-sealed type packaged bodies enclosed with longitudinal sealed portions and horizontal sealed portions, so that a great amount of film is required as compared to a three-sealed type packaged body having a folded portion in its side (non-sealed portion), while the expansion in the thickness direction (freedom degree) is restrained by the four sealed portions (sealing width: about 5-20 mm), so that there is a drawback that the volume efficiency of the packing material (filling amount of packing material/outer size of package bag) is low.

It is, therefore, an object of the invention to provide a fill-packaging method for plural rows capable of suppressing generation of longitudinal wrinkles in the horizontal sealed portion and simultaneously manufacturing packaged bodies each having a high volume efficiency of the packing material in plural rows, and a fill-packaging machine for plural rows and a fill-packaged body.

Solution for Task

In order to achieve the above object, the invention proposes a method for simultaneously and continuously manufacturing fill-packaged bodies of plural rows formed by filling a packing material into a package bag made of a plastic film, which comprises a process of forming a wide-width cylindrical body, a sealing and cutting process and a bag-making process, characterized in that the process of forming the wide-width cylindrical body is a process that at least non-folded side end portions of a single plastic film continuously unreeled in a longitudinal direction folded and overlapped in the widthwise direction or both side end portions of two continuously unreeled plastic films are continuously sealed to each other in the longitudinal direction by a pair of longitudinal sealing rolls to form a single wide-width cylindrical body, and the sealing and cutting process is a process that a longitudinally border sealed portion is continuously formed in one or more widthwise positions of the wide-width cylindrical body continuously unreeled in the longitudinal direction by a pair of longitudinal sealing and cutting rolls, while a widthwise central part of the longitudinally border sealed portion is continuously cut in the longitudinal direction to cut out the wide-width cylindrical body into a plurality of narrow-width cylindrical body rows arranged side by side, and the bag-making process is a process that horizontal sealing is applied at a predetermined interval in the longitudinal direction to each of the narrow-width cylindrical body rows cut out and run independently while filling a packing material therein to continuously shape the packaged bodies, and the longitudinally border sealed portion is cut out by the pair of longitudinal sealing and cutting rolls so as to leave a sealing width of not less than 0.3 mm but not more than 3.0 mm in each of the narrow-width cylindrical body rows.

In the fill-packaging method for plural rows according to the invention, the following construction is considered to provide a more preferable solution means. That is, the longitudinally border sealed portion is sealed and cut by the pair of longitudinal sealing and cutting rolls so as to leave a non-sealed portion in the widthwise central part being a cutting position.

Also, the invention proposes a fill-packaging machine for plural rows of simultaneously and continuously manufacturing plural rows of fill-packaged bodies formed by filling a packing material into a package bag made from a plastic film, characterized by comprising a pair of longitudinal sealing rolls, a pair of longitudinal sealing and cutting rolls and a pair of horizontal sealing rolls, wherein the pair of longitudinal sealing rolls continuously seal at least overlapped non-folded side end portions of the single plastic film folded in a widthwise direction to each other in the longitudinal direction or c both side end portions of two plastic films continuously unreeled to each other in the longitudinal direction to thereby continuously form a single wide-width cylindrical body, and the pair of longitudinal sealing and cutting rolls form a longitudinally border sealed portion by continuously heat-sealing one or more positions in the widthwise direction of the wide-width cylindrical body longitudinally and continuously unreeled in the longitudinal direction and continuously cut out a widthwise central part of the longitudinally border sealed portion in the longitudinal direction so that when the wide-width cylindrical body is cut into a plurality of independent narrow-width cylindrical body rows in parallel, the longitudinally border sealed portion is left in a sealing width of not less than 0.3 mm but not more than 3.0 mm at the side of the each narrow-width cylindrical body row, and the pair of horizontal sealing rolls apply horizontal sealing to each narrow-width cylindrical body row cut and run independently at a predetermined interval in the longitudinal direction while filling a packing material therein to continuously shape the packaged bodies.

In the fill-packaging machine for plural rows according to the invention, the following constructions are considered to provide more preferable solution means.

(1) each of the horizontal sealing rolls is provided with a plurality of heat-sealing bars arranged at an equal interval in the circumferential direction and a hollow portion for the formation of a pouring port is provided in the heat-sealing bar of at least one of the horizontal sealing rolls;

(2) at least one of the longitudinal sealing and cutting rolls is a roll having a mountain-shaped protruded peripheral face in which the longitudinally border sealed portion is formed by heating and pressurizing through the mountain-shaped portion and the widthwise central part of the longitudinally border sealed portion is sealed and cut to separate out the wide-width cylindrical body into the plurality of narrow-width cylindrical body rows;

(3) the longitudinal sealing and cutting rolls conduct sealing and cutting so as to leave a non-sealed portion in the widthwise central part of the longitudinally border sealed portion being a cutting position;

(4) a pair of squeeze rolls are arranged between the longitudinal sealing and cutting roll and the horizontal sealing roll; and (5) a cutting means is provided at a position of the horizontally sealed portion to cut the bag-shaped packaged bodies continuously shaped by the horizontal sealing rolls into one body or plural bodies.

Furthermore, the invention proposes a fill-packaged body formed by simultaneously manufacturing a plurality of fill-packaged body rows, each of which rows is comprised of fill-packaged bodies by filling a liquid packing material into a package bag made from a plastic film through a fill-packaging machine for plural rows, characterized in that the package bag is enclosed with longitudinally right and left sealed portions and horizontally up and down sealed portions, and a sealing width of at least one of the right and left longitudinal sealed portions is not less than 0.3 mm but not more than 3.0 mm.

In the fill-packaged body according to the invention, it is preferable to provide a pouring pathway comprised of a non-sealed portion in at least one of the up and down horizontal sealed portions.

Effect of the Invention

In the fill-packaging method for plural rows and the fill-packaging machine for plural rows according to the invention, the single wide-width cylindrical body is first made from the plastic film and thereafter the longitudinally border sealed portion is continuously formed in the longitudinal direction of the wide-width cylindrical body as plural rows by the longitudinal sealing and cutting rolls, while it is continuously cut at the widthwise central position of the longitudinally border sealed portion in the longitudinal direction so as to separate into plural rows of narrow-width cylindrical bodies and the packing material is filled and packaged into each independent row of the narrow-width cylindrical bodies while squeezing and horizontally sealed by the pair of horizontal sealing rolls. Thus, the rows of the narrow-width cylindrical bodies are not constrained to each other by the other row of the narrow-width cylindrical bodies arranged in parallel and are independent from each other, so that they can be deformed freely in the horizontal direction during the horizontal sealing, whereby tucking of the packing material into the horizontally sealed portion and the occurrence of longitudinal wrinkles can be suppressed.

According to the invention, the plural rows of the longitudinally border sealed portions are continuously formed in the aforementioned single wide-width cylindrical body in the longitudinal direction, while the widthwise central position of the longitudinally border sealed portion is continuously cut in the longitudinal direction, whereby the positioning of the cutting position becomes easy and it is possible to cut out the longitudinally border sealed portions so as to leave a sealing width of not less than 0.3 mm but not more than 3.0 mm in each of the narrow-width cylindrical body rows.

To this end, the longitudinally right and left sealed portions constructed by the longitudinally border sealed portions in the fill-packaged body manufactured by applying the horizontally sealed portion to the narrow-width cylindrical body rows becomes narrower as compared to the conventional one and hence the amount of the plastic film used can be decreased by about 20%.

According to the invention, the packaged body is not constrained by the longitudinally right and left sealed portions, so that it can be expanded freely in the thickness direction. As a result, it is possible to attain the volume efficiency equal to or more than that of the three-sealed type packaged body, while the use amount of the film and the production cost can be reduced.

In the conventional fill-packaging machine for plural rows, since the sealing width of each longitudinal sealing portion formed in plural rows is wide (more than 5 mm), a long time is required in the cooling of the longitudinal sealing portion and hence the longitudinal sealing portion is run out to the horizontal sealing means at a high temperature state. To this end, the temperature becomes too high in the horizontal sealing position overlapped with the longitudinal sealing portion and the plastic film is excessively fused and fluidized to cause troubles such as pinhole and so on.

On the other hand, according to the invention, the longitudinally border sealed portions can be cut out by the longitudinal sealing and cutting rolls so as to leave a sealing width of not less than 0.3 mm but not more than 3.0 mm in the each independent row of the narrow-width cylindrical bodies, so that the longitudinally border sealed portion located at the side end part of the rows of the narrow-width cylindrical bodies run out to the horizontal sealing rolls is narrow in the width and can be cooled rapidly. As a result, the excessive fusion of the plastic film is suppressed in the horizontal sealing and the occurrence of troubles such as pinhole and so on can be blocked.

In the fill-packaging machine for plural rows according to the invention, a pair of squeeze rolls are arranged between the longitudinal sealing and cutting rolls and the horizontal sealing rolls, whereby the filling amount of the packing material can be controlled, while the form of the narrow-width cylindrical body row run out to the horizontal sealing rolls can be stabilized to more suppress tucking of the packing material and the occurrence of longitudinal wrinkles in the horizontally sealed portion.

According to the invention, the peripheral face of at least one of the pair of longitudinal sealing and cutting rolls is protruded into a mountain form and the wide-width cylindrical body is cut through the mountain-shaped portion while heat sealing, whereby the positioning of the cutting position becomes unnecessary and the longitudinally narrow-width sealed portion of not less than 0.3 mm but not more than 3.0 mm can be formed in each side of the cutting position so as to define each row of the narrow-width cylindrical bodies.

In the invention, each of the pair of horizontal sealing rolls is provided with a plurality of heat-sealing bars arranged at equal intervals in the circumferential direction and a hollow portion is formed in the heat-sealing bar in at least one of the horizontal sealing rolls, whereby the horizontal sealing portion is heat-sealed so as to leave a non-sealed portion in a position corresponding to the hollow portion. According to the invention, the pouring pathway of the packing material comprised of the non-sealed portion can be formed simultaneously with the formation of the horizontal sealing portion.

EMBODIMENTS FOR CARRYING OUT THE INVENTION

Figure 1:
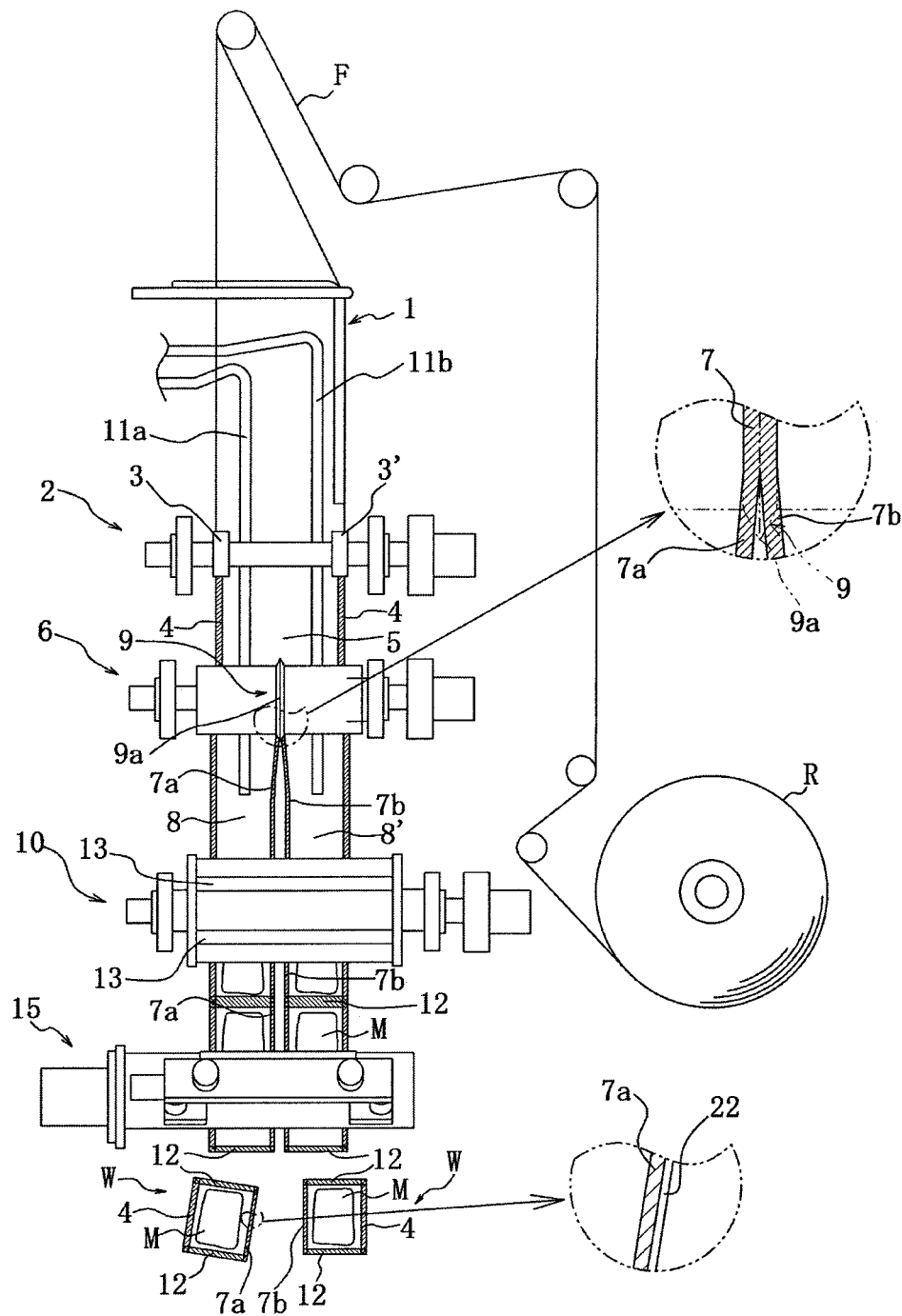
FIG. 1 is a schematic view illustrating an embodiment of the fill-packaging machine for plural rows according to the invention.

FIG. 1 is a schematic view illustrating an embodiment of the fill-packaging machine for plural rows according to the invention. A fill-packaging method for plural rows, a fill-packaging machine for plural rows and a fill-packaged body according to the invention will be described based on the drawings below.

In the fill-packaging machine for plural rows shown in FIG. 1, a plastic film F formed by laminating a base film layer made of a uniaxially or biaxially oriented polyethylene terephthalate film layer or a nylon resin film layer and a sealant layer made of a non-oriented polyethylene layer or a polypropylene layer is continuously unreeled from a film roll R wound with the plastic film F and run out from top to down, during which the plastic film F is folded in the widthwise direction so as to face the sealant layers to each other while guiding with a guide rod 1 and both side end portions thereof are overlapped with each other.

Next, the both side end portions of the folded and overlapped plastic film F are heated and pressurized by a pair of longitudinal sealing rolls 2 (extending in parallel in a horizontal face in an anteroposterior direction of the figure. Only the front side roll located at front side in the figure is shown.) while holding with the rolls, whereby the sealant layers are continuously fused and joined to each other in a longer direction (longitudinal direction) under the rotation of the longitudinal sealing rolls 2 to form a longitudinal sealing portion 4 to thereby form a wide-width cylindrical body 5.

The pair of longitudinal sealing rolls 2 are provided with a single driving motor and gear mechanism for rotating the rolls in opposite directions to each other at an equal speed (not shown) and a pair of air cylinders, for example, for pushing a bearing block of supporting both end portions of the one (front side) longitudinal sealing roll 2 toward a bearing block of supporting the other (rear side) longitudinal sealing roll 2.

Each of the pair of longitudinal sealing rolls 2 is provided on its outer peripheral face with one or more circular flange-shaped sealing bars 3, 3' at a predetermined interval and has a built-in heater contributing to heat the sealing bars 3, 3'.

In the pair of longitudinal sealing rolls 2, the front-side longitudinal sealing roll 2 is pushed toward the rear side longitudinal sealing roll 2 by a pair of cylinders not shown, and the overlapped side end portion and the folded end portion of the plastic film F are held between the both sealing bars 3, 3' and fused in a butt state by heating and pressurizing to form a longitudinal sealed portion 4 to thereby form a wide-width cylindrical body 5, while the wide-width cylindrical body 5 is run out downward viewing from the figure based on the rotation of the longitudinal sealing rolls 2.

Among the sealing bars 3, 3' disposed in positions corresponding to the overlapped side end portion and the folded end portion of the plastic film F, the sealing bar 3 may be disposed only in the overlapped side end portion while omitting the sealing bar 3' located at the folded end portion as another embodiment. Although the wide-width cylindrical body 5 is formed by folding the single elongated plastic film F in the widthwise direction as mentioned above, a longitudinal sealed portion 4 may be formed by overlapping two plastic films F unreeled from two film rolls R and heating and pressurizing both side end portions thereof in the longitudinal direction to thereby form the wide-width cylindrical body 5. In the latter case, the folded end portion is not existent, so that the sealing bars 3, 3' are necessary for the both side end portions.

As a feature of the invention, the wide-width cylindrical body 5 is held from both sides by a pair of longitudinal sealing and cutting rolls 6. For example, when the plural rows are two rows, as shown enlargedly in FIG. 1, it is continuously heat-sealed at a widthwise central position thereof in the longitudinal direction to form a longitudinally single border sealed portion 7, while two longitudinally narrow-width sealed portions 7a, 7b are continuously formed from the single wide-width cylindrical body 5 by cutting the longitudinally border sealed portion 7 at its widthwise central position in the longitudinal direction through sealing and cutting and separated away from each other to form two independent narrow-width cylindrical body rows 8, 8'. Thus, as shown in FIG. 1, one narrow-width cylindrical body row 8 of the two separated narrow-width cylindrical body rows is sealed at its side end portion with the longitudinal sealed portion 4 and the one longitudinally narrow-width sealed portion 7a formed by cutting the longitudinally border sealed portion 7 in the longitudinal direction, and the other narrow-width cylindrical body row 8' is at a state of sealing with the longitudinal sealed portion 4 and the other longitudinally narrow-width sealed portion 7b.

In the above embodiment is shown an example that the wide-width cylindrical body 5 is cut into two rows by the pair of longitudinal sealing and cutting rolls 6 to form two narrow-width cylindrical body rows 8, 8' independently arranged in parallel, but the invention is not limited thereto. For example, a plurality of longitudinal sealing and cutting rolls 6 may be disposed in the widthwise direction of the wide-width cylindrical body 5. In this case, the single wide-width cylindrical body 5 can be cut out into a plurality of independent narrow-width cylindrical body rows 8 . . . , and packaged bodies can be simultaneously manufactured in parallel from these narrow-width cylindrical body rows 8 . . . , so that the productivity can be increased. The both side end portions located at a middle position among the plurality of the narrow-width cylindrical body rows 8 . . . arranged side by side are formed with longitudinally narrow-width sealed portions 7a, 7b obtained by cutting the longitudinally border sealed portion 7 in the longitudinal direction.

Also, the longitudinally sealing and cutting roll 6 is enough to possess heat-sealing function and cutting function. For example, as shown in FIG. 1, a mountain-shaped sealing blade 9 is protruded in a peripheral face of at least one of the pair of longitudinal sealing and cutting rolls 6 and the longitudinally border sealed portion 7 is formed in the widthwise central part of the wide-width cylindrical body 5 by heating and pressurizing through the sealing blade 9 and at the same time the widthwise central part of the longitudinally border sealed portion 7 is cut to attain sealing and cutting, whereby the wide-width cylindrical body is cut out into two independent narrow-width cylindrical body rows 8, 8'.

Figure 2:
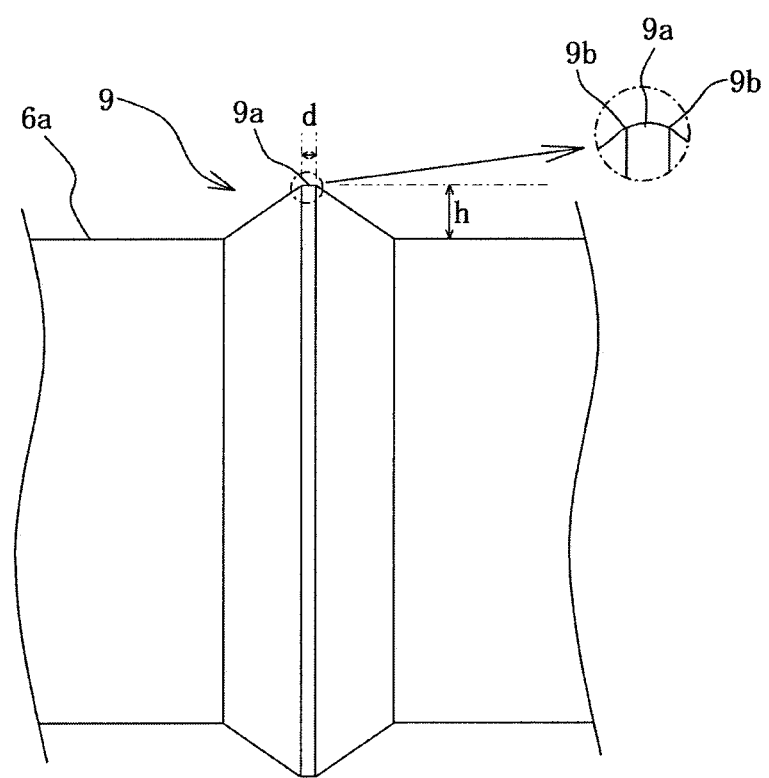
FIG. 2 is an end face view illustrating an embodiment of the longitudinal sealing and cutting roll used in the fill-packaging machine for plural rows according to the invention.

Moreover, the mountain-shaped sealing blade 9 arranged in the pair of sealing and cutting rolls 6 shown in FIG. 1 is desirable to have a flat blade edge 9a at its top as shown enlargedly in FIG. 2. The width d of the blade edge 9a is preferable to be 1.0-20 mm but is properly determined in accordance with the width of the longitudinally border sealed portion 7, width of the longitudinally narrow-width sealed portion 7a, 7b and the like.

The sealing blade 9 is preferable to have R (roundness) in a corner part 9b of the blade edge 9a. In this case, there is no fear of accidentally breaking the wide-width cylindrical body 5 in the position of the corner part 9b of the sealing blade 9 and the wide-width cylindrical body 5 can be cut in the position of the blade edge 9a of the sealing blade 9 while forming the longitudinally narrow-width sealed portions 7a, 7b.

Moreover, the longitudinally border sealed portion 7 is continuously cut at the approximately widthwise central position by the longitudinal sealing and cutting rolls 6, so that it is preferable that the longitudinally narrow-width sealed portions 7a, 7b located at the each side end portion of the narrow-width cylindrical body rows 8, 8' are cut and separated so as to form a sealing width of a length corresponding to not less than 3 times but not more than 10 times of a thickness of the two overlapped plastic films F (thickness of plastic film in a package bag for filling liquid is usually 50-150 μm/one film). The sealing width is not less than 0.3 mm but not more than 3.0 mm, more preferably not less than 0.5 mm but not more than 2.0 mm.

This is due to the fact that when the sealing width of the longitudinally narrow-width sealed portion 7a, 7b is a length corresponding to 3 times of the thickness of the two overlapped plastic films F or at least not less than 0.3 mm, a packaged body W capable of withstanding to a load exceeding 200 kgf can be provided, while when the sealing width is a length corresponding to not more than 10 times of the thickness of the two overlapped plastic films F or not more than 3.0 mm, the expansion of the narrow-width cylindrical body row 8, 8' in the thickness direction is not constrained by the longitudinally narrow-width sealed portion 7a, 7b and the filling amount of the packing material can be increased as compared to the conventional four-sealed type packaged body.

When the longitudinally narrow-width sealed portion 7a, 7b is heat-sealed by a pair of horizontal sealing rolls 10, there is a fear that the longitudinally narrow-width sealed portion is refused and the resin run off by the fusion is adhered to the horizontal sealing roll 10. Therefore, it is preferable that when the longitudinally border sealed portion 7 is sealed and cut by the longitudinal sealing and cutting rolls 6, as a part of the packaged body W is shown enlargedly in FIG. 1, a non-sealed zone 22 having a width of 0.3-1.5 mm, preferably 0.5-1.0 mm is left in each outer edge of the longitudinally narrow-width sealed portions 7a, 7b. Thus, the resin stuck out from the longitudinally narrow-width sealed portion 7a, 7b can be retained in the non-sealed zone 22, whereby the adhesion of the resin to the horizontal sealing roll 10 can be prevented effectively. Moreover, the longitudinally border sealed portion 7 is formed by the pair of longitudinally sealing and cutting rolls 6 at least one of which has a seal blade 9 having small angle blade edge 9a disposed on the peripheral face and a concave portion on the blade edge 9a in the circumferential direction, whereby a non-sealed portion is formed in the widthwise central part of the longitudinally border sealed portion 7 by suppressing the fusion of the plastic films each other due to the concave portion. And then, the non-sealed zone 22 can be provided on each of the outer edges of the longitudinally narrow-width sealed portions 7a, 7b by cutting out the non-sealed portion at the approximately widthwise central position.

When one of the pair of longitudinal sealing and cutting rolls 6 has the mountain-shaped sealing blade 9 as shown enlargedly in FIG. 2 and the other is comprised of, for example, a circularly flange-shaped sealing bar, a height h of the mountain-shaped sealing blade 9 from a surface of a rotating shaft 6a of the longitudinal sealing and cutting rolls 6 is preferably not less than 30% of the film thickness of the wide-width cylindrical body 5 (thickness of two laminated plastic films F) running between the pair of longitudinal sealing and cutting rolls 6, more preferably not less than 30% but less than 100%, further preferably not less than 50% but not more than 80%.

When the non-sealed portion formed in the approximately widthwise central part is cut by the mountain-shaped sealing blade 9 while forming the longitudinally border sealed portion 7 as mentioned above, even of the height h of the sealing blade 9 (blade edge 9a) is about 30% of the film thickness of the wide-width cylindrical body 5, breakage is propagated and promoted in the plastic film F, so that the wide-width cylindrical body 5 can be simply cut out into two independent narrow-width cylindrical body rows 8, 8'. Moreover, when the height h of the sealing blade 9 (blade edge 9a) is not less than 100% of the film thickness of the wide-width cylindrical body 5, there is a fear that the sealing blade 9 is contacted with the opposite sealing bars during the sealing and cutting to wear the top thereof and hence use over a long time of period cannot be attained and the exchange with new sealing blade 9 is required.

Moreover, the longitudinal sealing and cutting rolls 6 may be replaced with the following combination of rolls. That is, a pair of longitudinally border sealing rolls for continuously forming the longitudinally border sealed portion 7 in the longitudinal direction of the wide-width cylindrical body 5 and a pair of cutting rolls for continuously cutting the approximately widthwise central position of the longitudinally border sealed portion 7 in the longitudinal direction just beneath the longitudinally border sealing rolls (position separated from the longitudinally border sealing rolls to 80 mm-300 mm) may be combined instead of the longitudinal sealing and cutting rolls 6. In this case, a concave portion is formed along a central part of a sealing blade in at least one of the pair of longitudinally border sealing rolls to form a non-sealed portion having a width of not less than 0.5 mm but not more than 10 mm in the widthwise central part of the longitudinally border sealed portion 7. In addition, the widthwise central part of the non-sealed portion is continuously cut in the longitudinal direction by the above cutting rolls so as to form a longitudinal sealed portion having a width of not less than 0.3 mm but not more than 3.0 mm in each side of the non-sealed portion, whereby it is made possible to prevent the deterioration of the cutting performance with the lapse of time due to the adhesion of resin sludge or the like to the blade edge portion of the cutting roll.

The sealing width of the longitudinal sealed portion 4 formed by the longitudinal sealing rolls 2 and the horizontal sealed portion 12 formed by the horizontal sealing rolls 10 are not particularly limited. However, when the each of the right and left longitudinal sealed portions and the up and down horizontal sealed portions is preferably not less than 0.3 mm but not more than 3.0 mm, the filling amount of the packing material can be further increased.

In the conventional fill-packaging machine for plural rows, for example, the single wide-width plastic film is folded into two parts and a plurality of longitudinal sealed portions are formed therein to form a plurality of cylindrical portion rows and filling of the packing material and horizontal sealing are conducted to each cylindrical portions and thereafter the cylindrical portion rows are cut in longitudinal sealing position and horizontal sealing position, whereby package bodies are separated every package body or every plural package bodies. In this method, it is difficult to set cutting position of the longitudinal sealing portion and the horizontal sealing portion in a pinpoint, so that the sealing width is necessary to be set to a wide width (exceeding 5 mm) and hence the temperature of the longitudinal sealing portion is not lowered quite and run out into the horizontal sealing means at a high temperature state. To this end, the heating temperature becomes too high at a position of overlapping with the longitudinal sealing portion during the horizontal sealing, so that the plastic film is excessively fused and fluidized to cause the occurrence of pinhole or the like.

On the contrary, the narrow-width cylindrical body rows 8, 8' are run independently and the sealing width of the longitudinally narrow-width sealed portion 7a, 7b located at each side end portion of the longitudinally narrow-width cylindrical body rows 8, 8' is made to not more than 3.0 mm, whereby the longitudinally narrow-width sealed portion 7a, 7b is rapidly cooled and it can be expected to suppress excessive fusion of the plastic film during the horizontal sealing.

The packing material M fed from a tank not shown through a pump and a feeding path not shown is continuously filled through filling nozzles 11a, 11b into the interiors of the cut-out narrow-width cylindrical portion rows 8, 8'.

In the pair of horizontal sealing rolls 10, the independently run narrow-width cylindrical body rows 8, 8' are simultaneously held, while the packing material filled in the narrow-width cylindrical body rows 8, 8' at predetermined intervals in the longitudinal direction is squeezed out and the squeezing position is heated and pressurized to form the horizontal sealed portion 12, and many packaged bodies W enclosed at up and down end portions with the horizontal sealed portions 12 and at the right and left end portions with the longitudinal sealed portions 4 or the longitudinally narrow-width sealed portions 7a, 7b can be manufactured at a state of connecting to each other in the longitudinal direction of the plastic film F.

Since each of the narrow-width cylindrical body rows 8, 8' is at an independent state, it can be deformed (widened) in the widthwise direction (horizontal direction) in the holding with the pair of horizontal sealing rolls 10. Therefore, the heat sealing can be performed by the pair of horizontal sealing rolls 10 while squeezing out the packing material included in the horizontal sealing position, whereby the tucking of the packing material into the horizontal sealed portion 12 and the occurrence of longitudinal wrinkles can be suppressed effectively.

The pair of horizontal sealing rolls 10 are extended in parallel anteroposteriorly in the figure (only a front side roll located at a front side in the figure is shown) and rotated and driven by a motor in opposite direction to each other at an equal speed through gear sets. For example, a plurality of heat-sealing bars 13 are provided on the outer peripheral face of the horizontal sealing roll 10 at equal intervals and extended in an axial direction thereof, and the narrow-width cylindrical body rows 8, 8' are held and heated by the opposite heat sealing bars 13, whereby the horizontal sealed portion 12 can be formed over the full width in the direction perpendicular to the running direction of the narrow-width cylindrical body rows 8, 8'.

As the horizontal sealing means, the pair of horizontal sealing rolls may be provided at two stages. In this case, the horizontal sealed portion 12 is formed by heating and pressurizing the narrow-width cylindrical body rows 8, 8' at the first stage, while the horizontal sealed portion 12 can be set and stabilized by pushing the horizontal sealed portion 12 onto the cooled sealing bars at the second stage.

The packaged bodies W continuously manufactured by the horizontal sealing rolls 10 are cut in the widthwise direction at an approximately middle position in the running direction of the horizontal sealed portion 12 by a cutting means 15 such as rotary cutter or the like to separate into one body or predetermined plural bodies, or perforations are formed in an approximately middle position in the running direction of the horizontal sealed portion 12 to carry out the packaged bodies at a state of connecting the plural bodies to each other.

Figure 3:
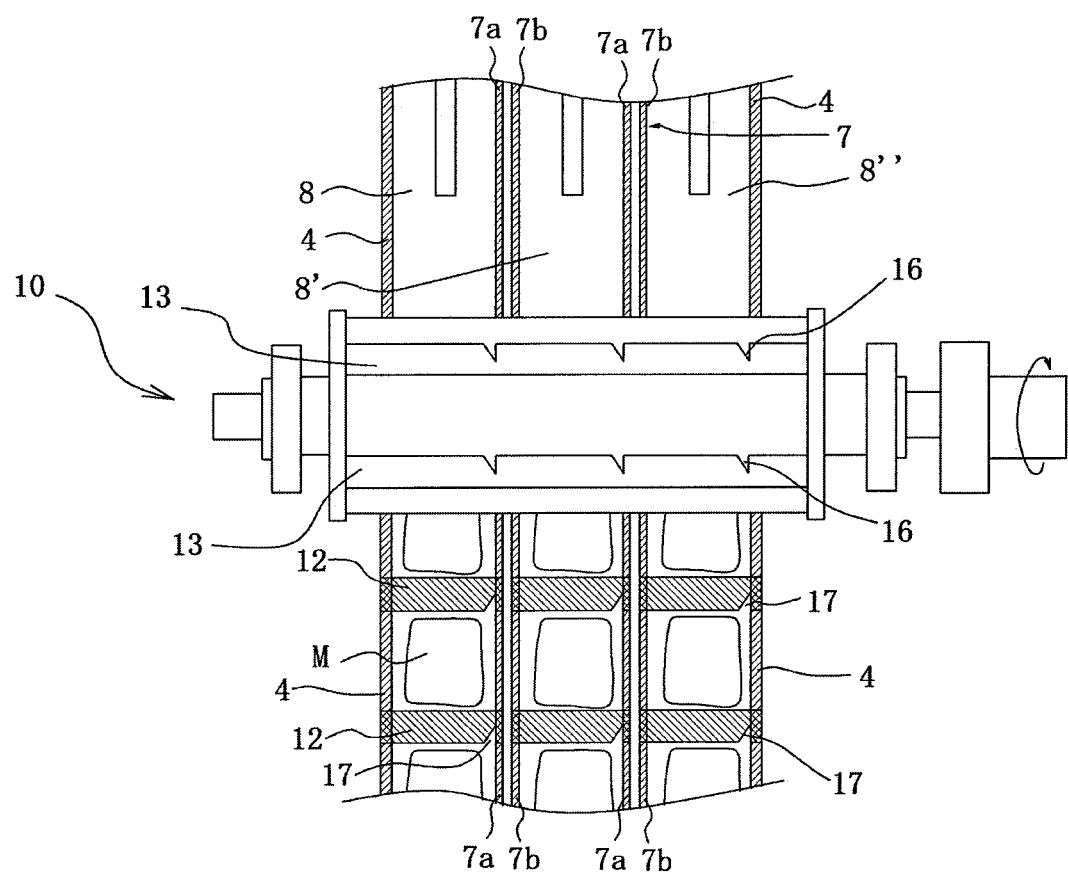
FIG. 3 is an enlarged view illustrating another embodiment of the horizontal sealing roll used in the fill-packaging machine for plural rows according to the invention.

In FIG. 3 is enlargedly shown another embodiment of the horizontal sealing rolls 10 used in the fill-packaging machine for plural rows, which shows a case of manufacturing three rows of the packaged bodies W in parallel as an example.

Each of the pair of horizontal sealing rolls 10 (only the front-side horizontal sealing roll is shown in the figure) is provided with a plurality of heat-sealing bars 13 extending in the axial direction of the roll, while a hollow portion 16 is formed in the end portion of the heat-sealing bar 13 disposed in at least one of the horizontal sealing rolls 10. When the narrow-width cylindrical body rows 8, 8', 8" are heated and pressurized while holding by the pair of heat-sealing bars 13, the position corresponding to the hollow portion 16 becomes a non-sealed portion, and hence a pouring pathway 17 comprised of the non-sealed portion is formed in the horizontal sealed portion 12.

Figure 4:
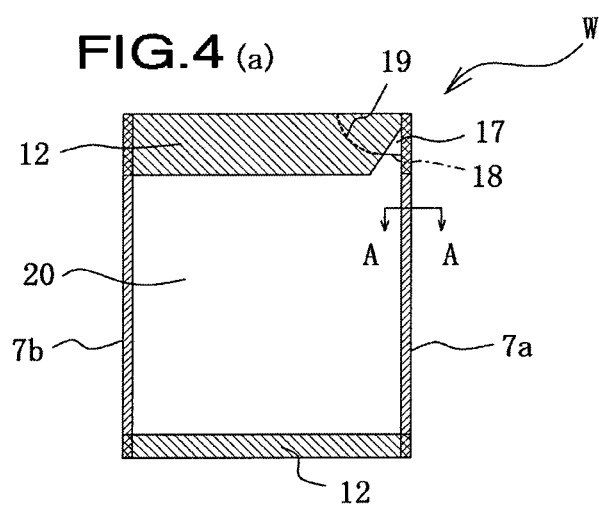
FIG. 4(a) is a front view illustrating a packaged body manufactured by a fill-packaging machine for plural rows provided with the horizontal sealing roll of FIG. 3
FIG. 4(b) is an end face view at a position A-A of FIG. 4(a).
Figure 4:
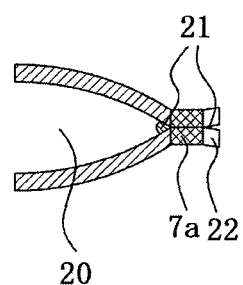

The hollow portion 16 is preferable to be provided in such a form that the pouring pathway 17 formed in the horizontal sealed portion 12 is adjacent to the longitudinally narrow-width sealed portion 7a (and/or 7b) on the upper-side horizontal sealed portion 12, preferably gradually narrowed toward an upper edge of the upper-side horizontal sealed portion 12. FIG. 4(a) shows a packaged body W manufactured by the horizontal sealing rolls 10 of FIG. 3 (a packaged body W manufactured in a middle narrow-width cylindrical body row 8' among three narrow-width cylindrical body rows 8, 8', 8"), which is enclosed with longitudinally narrow-width sealed portions 7a, 7b and horizontal sealed portion 12. As seen from this packaged body W, the pouring pathway 17 is tapered toward a pouring port 18 formed by opening a tip portion thereof, and hence the pushing direction of the packing material becomes constant without scattering the packing material and the occurrence of liquid dropping can be suppressed.

When a tear-guiding mark 19 of a linear or curved form is arranged from an upper edge of the upper-side horizontal sealed portion 12 of the packaged body W toward a side edge of the pouring pathway 17 as shown in FIG. 4(a), the pouring port 18 can be opened simply by tearing along the tear-guiding mark 19. In this case, a starting end of the tear-guiding mark 19 locates at the midpoint of the upper end of the upper-side horizontal sealed portion 12, so that there is no fear that the tear-guiding mark 19 is broken accidentally by catching the staring end of the tear-guiding mark 19 with the rolls or the like during the automatic fill-packaging.

Even in the packaged body W shown in FIG. 4(a), the longitudinally narrow-width sealed portions 7a, 7b are made narrower by cutting the longitudinally border sealed portion 7 so that the sealing width is not less than 3 times but not more than 10 times of the thickness of the two laminated plastic films F or not less than 0.3 mm but not more than 3.0 mm. Thus, as shown by an end face view at a position A-A in FIG. 4(b), when the longitudinally narrow-width sealed portion 7a is formed by cutting the longitudinally border sealed portion 7, the sealant layer of the plastic film is somewhat stuck out toward the side of the filing space 20 for the packing material to form a resin residence 21, and an edge portion of the pouring pathway 17 at the side of the longitudinally narrow-width sealed portion 7a is at a state of always opening in a straw form by the presence of the resin residence 21. To this end, the packing material is easily poured along the pouring pathway 17 and the occurrence of liquid dropping can be suppressed effectively. Also, it is preferable to provide the non-sealed zone 22 in the outer edge of the longitudinally narrow-width sealed portion 7a as mentioned above. By the non-sealed zone 22 can be retained the resin of the longitudinally narrow-width sealed portion 7a refused during the formation of the horizontal sealed portion 12 to form the resin residence 21 as shown in FIG. 4(b), whereby the deterioration of the cutting performance due to the adhesion of the resin to the horizontal sealing rolls 10 can be prevented.

Figure 5:
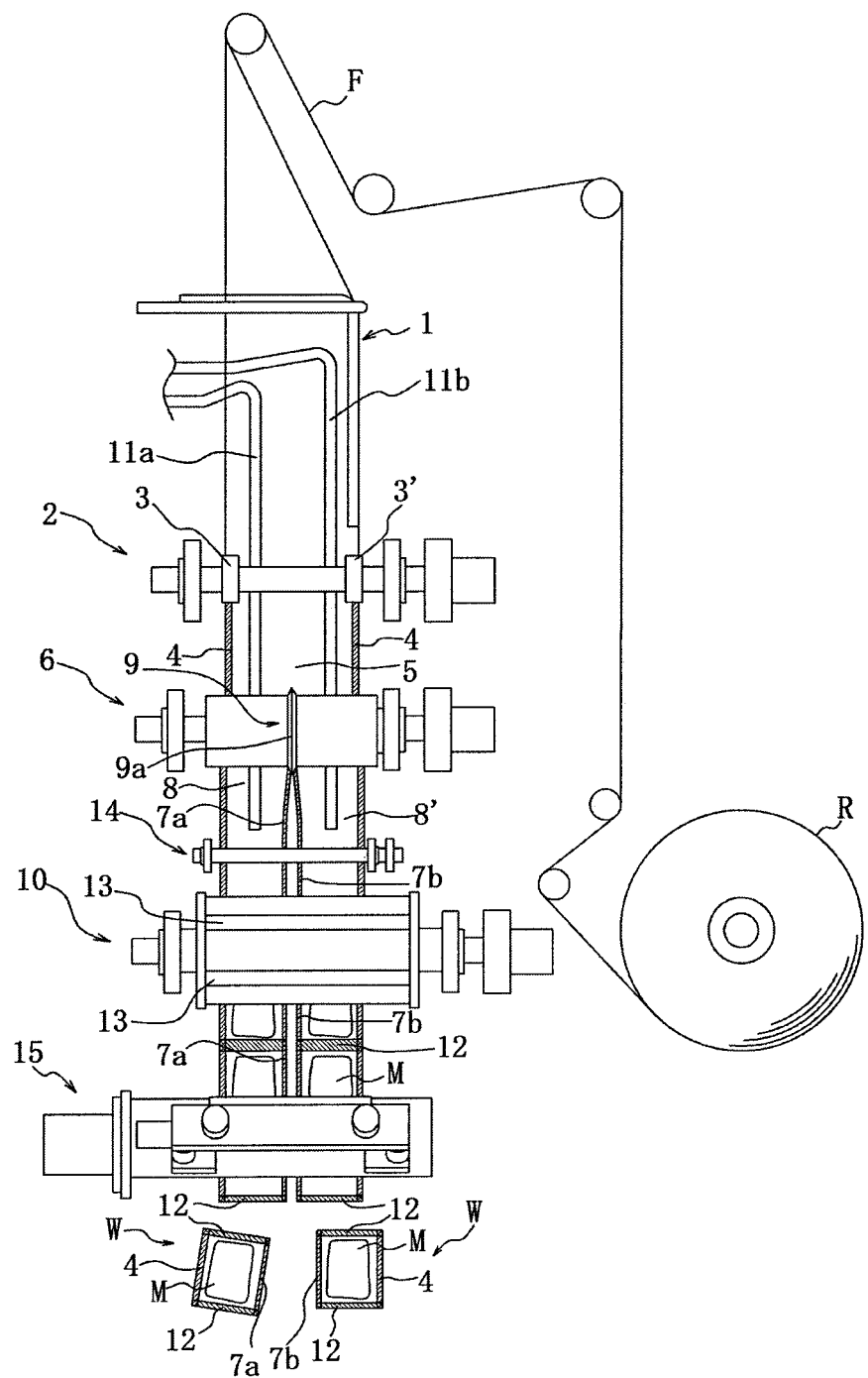
FIG. 5 is a schematic view illustrating another embodiment of the fill-packaging machine for plural rows according to the invention.

FIG. 5 shows the other embodiment of the fill-packaging machine for plural rows according to the invention. In this fill-packaging machine for plural rows, a pair of squeezing rolls 14 (only the front side roll located at the front side in the figure is shown) are disposed between the longitudinal sealing and cutting roll 6 and the horizontal sealing roll 10. It is preferable that the pair of squeezing rolls 14 are rotated and driven, for example, by a motor at an equal speed in opposite directions to each other through gear sets. The filling amount of the packing material to be filled in the package bag W can be adjusted by controlling the interval between the pair of squeezing rolls 14, while the form of the narrow-width cylindrical body row 8, 8' can be stabilized to more suppress the occurrence of longitudinal wrinkles in the horizontal sealed portion 12 through the horizontal sealing rolls 10.

INDUSTRIAL APPLICABILITY

The fill-packaging machine for plural rows according to the invention can be preferably utilized when packaged bodies for liquid, viscous, powdery or granular material such as food and drink, seasoning, medicines, chemicals and so on are simultaneously manufactured in parallel.

DESCRIPTION OF REFERENCE SYMBOLS 1 guide rod
2 longitudinal sealing roll
3, 3' circular flange
4 longitudinal sealed portion
5 wide-width cylindrical body
6 longitudinal sealing and cutting roll
6a rotating shaft
7 longitudinally border sealed portion
7a, 7b longitudinally narrow-width sealed portion
8, 8', 8" narrow-width cylindrical body row
9 sealing blade
9a blade edge
9b corner part
10 horizontal sealing roll
11a, 11b filling nozzle
12 horizontal sealed portion
13 heat-sealing bar
14 squeezing roll
15 cutting means
16 hollow portion
17 pouring pathway
18 pouring port
19 tear-guiding mark
20 filling space
21 resin residence
22 non-sealed portion
R film roll
F plastic film
W packaged body
M packing material

The invention claimed is:

1. A method for simultaneously and continuously manufacturing fill-packaged bodies of plural rows formed by filling a packing material into a package bag made of a plastic film, which comprises:
a process of forming a wide-width cylindrical body, a sealing and cutting process, and a bag-making process, wherein
the process of forming the wide-width cylindrical body is a process that at least non-folded side end portions of a single plastic film continuously unreeled in a longitudinal direction folded and overlapped in a widthwise direction or both side end portions of two continuously unreeled plastic films are continuously sealed to each other in the longitudinal direction by a pair of longitudinal sealing rolls to form a single wide-width cylindrical body,
the sealing and cutting process is a process that a longitudinally border sealed portion is continuously formed in one or more widthwise positions of the wide-width cylindrical body continuously unreeled in the longitudinal direction by a pair of longitudinal sealing and cutting rolls, while a widthwise central part of the longitudinally border sealed portion is continuously cut in the longitudinal direction to cut out the wide-width cylindrical body into a plurality of narrow-width cylindrical body rows arranged side by side,
the bag-making process is a process that horizontal sealing is applied at a predetermined interval in the longitudinal direction to each of the narrow-width cylindrical body rows cut out and run independently while filling the packing material therein to continuously shape the packaged bodies, and
the longitudinally border sealed portion is cut out by the pair of longitudinal sealing and cutting rolls so as to leave a sealing width of not less than 0.3 mm but not more than 3.0 mm in each of the narrow-width cylindrical body rows.

2. The fill-packaging method for plural rows according to claim 1, wherein the longitudinally border sealed portion is sealed and cut by the pair of longitudinal sealing and cutting rolls so as to leave a non-sealed portion in the widthwise central part being a cutting position.

3. A fill-packaging machine for plural rows of simultaneously and continuously manufacturing plural rows of fill-packaged bodies formed by filling a packing material into a package bag made from a plastic film, comprising:
a pair of longitudinal sealing rolls, a pair of longitudinal sealing and cutting rolls, and a pair of horizontal sealing rolls, wherein
the pair of longitudinal sealing rolls continuously seal at least overlapped non-folded side end portions of the single plastic film folded in a widthwise direction to each other in a longitudinal direction or both side end portions of two plastic films continuously unreeled to each other in the longitudinal direction to thereby continuously form a single wide-width cylindrical body,
the pair of longitudinal sealing and cutting rolls form a longitudinally border sealed portion by continuously heat-sealing one or more positions in the widthwise direction of the wide-width cylindrical body longitudinally and continuously unreeled in the longitudinal direction and continuously cut out a widthwise central part of the longitudinally border sealed portion in the longitudinal direction so that when the wide-width cylindrical body is cut into a plurality of independent narrow-width cylindrical body rows in parallel, the longitudinally border sealed portion is left in a sealing width of not less than 0.3 mm but not more than 3.0 mm at a side of each of the narrow-width cylindrical body rows, and
the pair of horizontal sealing rolls apply horizontal sealing to each narrow-width cylindrical body row cut and run independently at a predetermined interval in the longitudinal direction while filling the packing material therein to continuously shape the packaged bodies.

4. The fill-packaging machine for plural rows according to claim 3, wherein each of the horizontal sealing rolls is provided with a plurality of heat-sealing bars arranged at an equal interval in a circumferential direction and a hollow portion for formation of a pouring port is provided in the heat-sealing bar of at least one of the horizontal sealing rolls.

5. The fill-packaging machine for plural rows according to claim 3, wherein at least one of the longitudinal sealing and cutting rolls is a roll having a mountain-shaped protruded peripheral face in which the longitudinally border sealed portion is formed by heating and pressurizing through the mountain-shaped portion and the widthwise central part of the longitudinally border sealed portion is sealed and cut to separate out the wide-width cylindrical body into the plurality of narrow-width cylindrical body rows.

6. The fill-packaging machine for plural rows according to claim 5, wherein the longitudinal sealing and cutting rolls conduct sealing and cutting so as to leave a non-sealed portion in the widthwise central part of the longitudinally border sealed portion being a cutting position.

7. The fill-packaging machine for plural rows according to claim 6, wherein a pair of squeeze rolls are arranged between the longitudinal sealing and cutting rolls and the horizontal sealing rolls.

8. The fill-packaging machine for plural rows according to claim 6, wherein a cutter is provided at a position of the horizontally sealed portion to cut the bag-shaped packaged bodies continuously shaped by the horizontal sealing rolls into one body or plural bodies.

9. The fill-packaging machine for plural rows according to claim 5, wherein a pair of squeeze rolls are arranged between the longitudinal sealing and cutting rolls and the horizontal sealing rolls.

10. The fill-packaging machine for plural rows according to claim 5, wherein a cutter is provided at a position of the horizontally sealed portion to cut the bag-shaped packaged bodies continuously shaped by the horizontal sealing rolls into one body or plural bodies.

11. The fill-packaging machine for plural rows according to claim 3, wherein the longitudinal sealing and cutting rolls conduct sealing and cutting so as to leave a non-sealed portion in the widthwise central part of the longitudinally border sealed portion being a cutting position.

12. The fill-packaging machine for plural rows according to claim 11, wherein a pair of squeeze rolls are arranged between the longitudinal sealing and cutting rolls and the horizontal sealing rolls.

13. The fill-packaging machine for plural rows according to claim 11, wherein a cutter is provided at a position of the horizontally sealed portion to cut the bag-shaped packaged bodies continuously shaped by the horizontal sealing rolls into one body or plural bodies.

14. The fill-packaging machine for plural rows according to claim 3, wherein a pair of squeeze rolls are arranged between the longitudinal sealing and cutting rolls and the horizontal sealing rolls.

15. The fill-packaging machine for plural rows according to claim 3, wherein a cutter is provided at a position of the horizontally sealed portion to cut the bag-shaped packaged bodies continuously shaped by the horizontal sealing rolls into one body or plural bodies.

\* \* \* \* \*